United States Patent
Sonoda et al.

(10) Patent No.: US 7,239,483 B2
(45) Date of Patent: Jul. 3, 2007

(54) MAGNETIC DISK WITH SPECIFIED CONTACT RATIO [BH 1.0 NM] AND CIRCUMFERENTIAL TEXTURING AND MAGNETIC DISK APPARATUS EQUIPPED WITH MAGNETIC DISK

(75) Inventors: Koji Sonoda, Ome (JP); Junya Kato, Ichihara (JP); Masato Fukushima, Ichihara (JP); Yukihisa Matsumura, Ichihara (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 401 days.

(21) Appl. No.: 10/926,395

(22) Filed: Aug. 26, 2004

(65) Prior Publication Data
US 2005/0052987 A1    Mar. 10, 2005

(30) Foreign Application Priority Data
Aug. 29, 2003   (JP)   ............................. 2003-307390

(51) Int. Cl.
*G11B 5/82* (2006.01)
*G11B 5/73* (2006.01)

(52) U.S. Cl. .................................. 360/135; 428/848.2

(58) Field of Classification Search .................... None
See application file for complete search history.

(56) References Cited

U.S. PATENT DOCUMENTS

| | | |
|---|---|---|
| 6,475,599 B1 | 11/2002 | Saito et al. |
| 6,509,111 B1 * | 1/2003 | Shoda et al. ................. 428/831 |
| 6,852,432 B2 * | 2/2005 | Shoda et al. ............. 428/831.2 |
| 2006/0194080 A1 * | 8/2006 | Ishii et al. ................... 428/800 |

FOREIGN PATENT DOCUMENTS

| | | |
|---|---|---|
| JP | 2001-143246 | 5/2001 |
| JP | 2001-160214 | 6/2001 |

* cited by examiner

*Primary Examiner*—Kevin M. Bernatz
(74) *Attorney, Agent, or Firm*—Pillsbury Winthrop Shaw Pittman, LLP

(57) ABSTRACT

A texture processing for imparting a magnetic orientation in the circumferential direction is applied to a substrate so as to impart a magnetic anisotropy to the magnetic disk in the circumferential direction. An underlying film, a magnetic recording film, a protective film, and a lubricating film are laminated one upon the other on the surface of the substrate. The surface of the magnetic disk has a value of the contact ratio [BH 1.0 nm] falling within a range of 7% to 15% in a region having a height not smaller than 1.0 nm, based on the height at which the contact ratio in the bearing curve of a surface roughness is 50%.

8 Claims, 6 Drawing Sheets

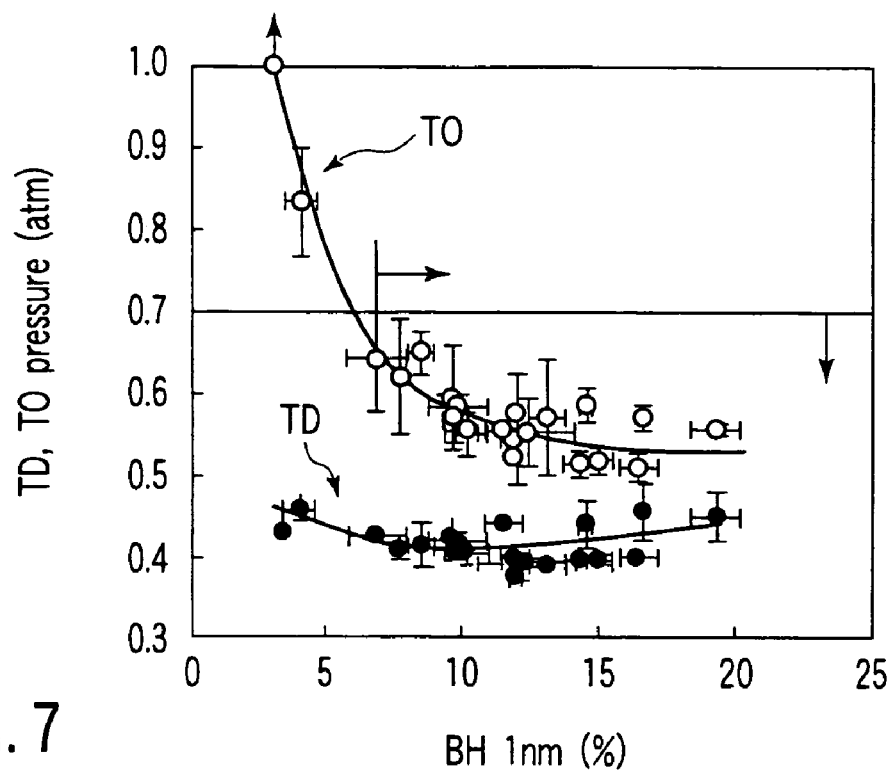
F I G. 7
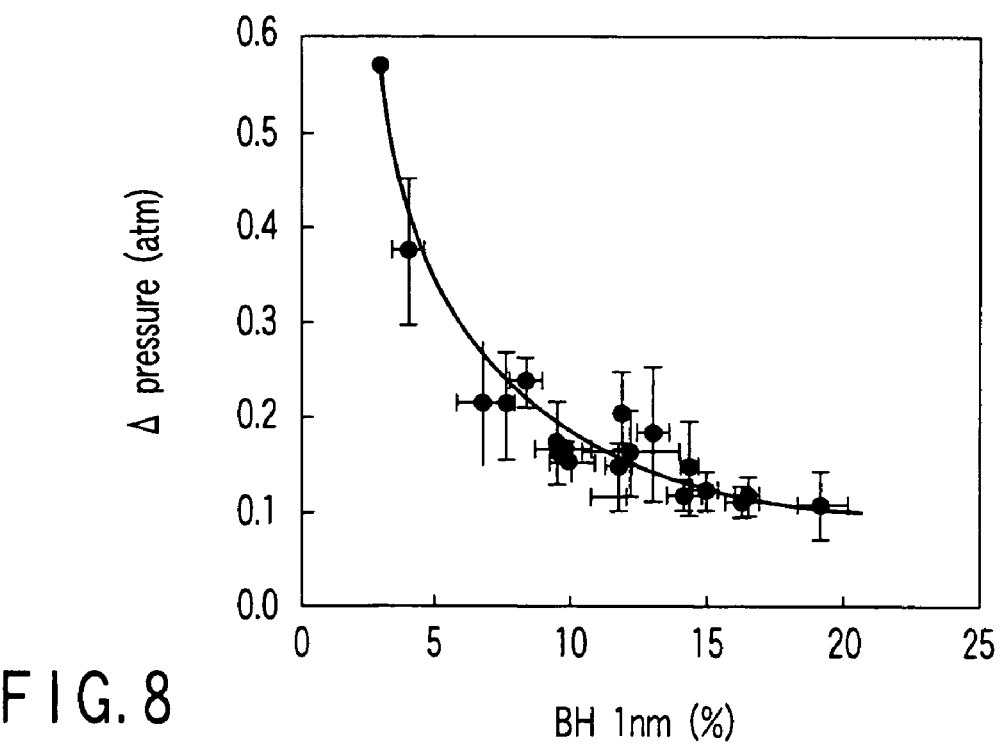
F I G. 8

| Samples | BH 1.0nm (%) | Lubricant pick-up |
|---|---|---|
| 1 | 6.19 | None |
| 2 | 6.08 | None |
| 3 | 7.80 | None |
| 4 | 12.16 | None |
| 5 | 15.09 | Found |
| 6 | 22.10 | Found |

|  | Radial position (mm) | BH 1.0nm (%) | TD pressure (atm) | TO pressure (atm) | Δ pressure (atm) | Decrease in rotating speed |
|---|---|---|---|---|---|---|
| This embodiment | 11 | 8.4 | 0.50 | 0.62 | 0.12 | - |
|  | 16 | 7.2 | 0.43 | 0.64 | 0.21 | - |
|  | 21 | 7.2 | 0.43 | 0.65 | 0.22 | - |
| Comparative example 1 | 11 | 7.3 | 0.50 | 0.67 | 0.17 | - |
|  | 16 | 7.4 | 0.42 | 0.63 | 0.21 | - |
|  | 21 | 7.0 | 0.43 | 0.67 | 0.24 | - |
| Comparative example 2 | 11 | 5.5 | 0.51 | 0.77 | 0.26 | - |
|  | 16 | 4.2 | 0.42 | 0.75 | 0.33 | - |
|  | 21 | 3.5 | 0.40 | 0.89 | 0.49 | Decreased |

MAGNETIC DISK WITH SPECIFIED CONTACT RATIO [BH 1.0 NM] AND CIRCUMFERENTIAL TEXTURING AND MAGNETIC DISK APPARATUS EQUIPPED WITH MAGNETIC DISK

CROSS-REFERENCE TO RELATED APPLICATIONS

This application is based upon and claims the benefit of priority from prior Japanese Patent Application No. 2003-307390, filed Aug. 29, 2003, the entire contents of which are incorporated herein by reference.

BACKGROUND OF THE INVENTION

1. Field of the Invention

The present invention relates to a magnetic disk capable of achieving a high density magnetic recording and to a magnetic disk apparatus having the magnetic disk mounted thereto, particularly, to a magnetic disk capable of reading-writing with the fly height of the magnetic head set at a level not higher than 10.0 nm and to a magnetic disk apparatus equipped with the particular magnetic disk.

2. Description of the Related Art

In general, a magnetic disk apparatus comprises a magnetic disk arranged within a case, a spindle motor for supporting and rotating the magnetic disk, and a head suspension assembly (hereinafter referred to as HSA) including a magnetic head for reading-writing information in and from the magnetic disk.

The HSA includes a slider having a magnetic head formed thereon, a suspension supporting the slider, and an arm supporting the suspension. The HSA is rotatably supported by a bearing assembly. The magnetic head can be moved to an optional position on the magnetic disk by allowing the HSA to be rotated by a voice coil motor.

In order to suppress the change in the slider behavior when the magnetic disk is unintentionally brought into contact with the magnetic disk in the magnetic disk apparatus, it is necessary to increase the roughness of the magnetic disk surface to some extent so as to reduce the adhesion force of the slider relative to the magnetic disk. In the conventional magnetic disk apparatus, the fly height of the magnetic head is not smaller than 10.0 nm. Therefore, even in the case of using a magnetic disk in which the height of the asperity on the surface of the disk (i.e., the asperity height) is not smaller than 4.0 nm, it is possible to ensure the fly height margin of the magnetic head, i.e., the minimum distance between the magnetic head and the magnetic disk, so as to make it possible to maintain the fly height stability of the magnetic head.

However, the recording density of the magnetic disk has been increased to reach 70 GB/inch$^2$ in recent years so as to make it necessary to set the fly height of the magnetic head to a level not higher than 10.0 nm. Under the particular situation, the fly height margin of the magnetic head is eliminated if the asperity height of the magnetic disk surface is not smaller than 4.0 nm. As a result, the thermal asperity is generated, or the reliability is lowered. Incidentally, thermal asperity noted above denotes the phenomenon that the output of the MR (magnetoresistance sensor) in the magnetic head is changed by the heat that is generated when the magnetic head collides against the asperity.

In order to improve the SN ratio included in the electromagnetic characteristics, it is attempted in recent years to apply a texture processing to the substrate of the magnetic disk so as to impart a magnetic anisotropy to the magnetic disk. To be more specific, the easy axis of magnetization of a Co alloy layer constituting the magnetic recording layer is oriented in the circumferential direction by the texture processing, with the result that the residual magnetization and the squareness ratio in the circumferential direction are rendered high relative to those in the radial direction of the magnetic disk. Since the read output is improved substantially in proportion to the residual magnetization, the thickness of the magnetic layer can be decreased so as to improve the magnetization transition width, the capability of suppressing the noise and the overwrite characteristics. It should be noted that the texture medium (anisotropic medium) having the texture processing applied thereto exhibits an improvement in the resolution, the full width at half-maximum, and the SN ratio and, thus, is allowed to have a big merit as a recording medium having a high recording density. Such being the situation, the practical use of the texture medium constitutes an effective means for achieving a high density recording.

However, the asperities on the disk surface are also removed by the texture processing, with the result that the surface roughness of the magnetic disk tends to be rendered very low. It follows that the absorption properties of the magnetic head relative to the magnetic disk are increased. Such being the situation, in order to obtain a texture medium having a high reliability, it is necessary to control severely the surface roughness of the disk so as to optimize the surface roughness.

An average roughness Ra, which is defined in Japanese Industrial Standards (JIS B 0601) is widely used as an index of the surface roughness. In the average roughness Ra noted above, the depth or height of the asperity or valley on the surface of the magnetic disk from the center line of the surface height is integrated and averaged. However, the friction force that is generated when the magnetic head is brought into contact with the magnetic disk is much related to the contact area occupied by the asperity of the magnetic disk and is less related to the valley. Such being the situation, the average roughness Ra is insufficient for use as an index of the surface roughness denoting the relevancy to the fly height stability of the magnetic head.

Difference Rp between the center line of the height of the asperity on the surface of the recording and the maximum height of the asperity on the surface of the magnetic disk is also known as another index. However, the difference Rp noted above does not denote the average height of the asperity. It follows that, even if the index Rp is large, it is possible for the surface having a low average roughness such as a texture medium to fail to lower the friction force in the stage of the contact between the magnetic head and the asperity on the surface of the magnetic disk unless the high asperity are included in a large area on the surface of the recording medium. It follows that the relevancy of the index Rp to the fly height stability is low.

In recent years, the difference $\Delta BH[0.01, 50]$ between the height $BH[0.01\%]$ at which the contact ratio in the bearing curve is 0.01% and the height $BH[50\%]$ at which the contact ratio in the bearing curve is 50%, i.e., $\Delta BH[0.01, 50]=|BH[0.01\%]-BH[50\%]|$, is used as an index of the surface roughness, as disclosed in, for example, Japanese Patent Disclosure (Kokai) No. 2001-160214. Proposed in this prior art is a magnetic disk having the difference $\Delta BH[0.01, 50]$ set to fall within a range of between 0.3 nm and 6.0 nm.

Proposed in Japanese Patent Disclosure No. 2001-143246 is a substrate for an information recording medium in which the height of the surface roughness at 0.4% of the contact ratio falls within a range of between 2.0 nm and 7.0 nm under the condition that the case where the contact ratio of the surface roughness is 50% is used as the standard height.

However, where these technologies are applied to the texture medium, the index of the roughness noted above is insufficient so as to make it difficult to achieve both a high recording density and a high reliability.

To be more specific, in the magnetic disk noted above, the roughness is defined with the height at 50% of the area ratio of the bearing curve used as a standard. However, the roughness is defined with attentions paid to the height of a small number of asperities having the contact area ratio of 0.01% or 0.4%, particularly, to the high asperities having a height not smaller than 5.0 nm. In the texture medium, however, the maximum height of the asperity is not larger than 3.0 nm. It is considered reasonable to understand that the asperities on the surface of the magnetic head are pushed into the head slider by several nanometers when the head slider is brought into contact with the surface of the magnetic disk. Therefore, the factor substantially determining the adhesion properties between the slider and the surface of the magnetic disk is the contact area at the time when the asperities are pushed into the slider in a height of up to about 1.0 nm. It follows that it is insignificant to argue the high asperities having a height not smaller than 5.0 nm and, thus, the index of the roughness noted above is insufficient in respect of the texture medium.

The magnetic disk disclosed in Japanese Patent Disclosure No. 2001-160214 noted above covers the case where the asperity has a height of 4.0 to 6.0 nm. However, in order to realize a desired fly height of the magnetic disk, which is not larger than 10.0 nm, and a desired recording density, which is not lower than 70 GB/inch$^2$, it is difficult for the asperity height noted above to achieve both a high recording density and a high reliability.

In the magnetic disk disclosed in Japanese Patent Disclosure No. 2001-143246 noted above, the surface roughness that is important in realizing the recording with a very low fly height of the magnetic head is not substantially defined.

BRIEF SUMMARY OF THE INVENTION

A magnetic disk according to an aspect of the present invention comprises a substrate, a laminate structure formed on the substrate, the laminate structure including an underlying film, a magnetic recording film, a protective film and a lubricating film, and a disk surface applied with a texture processing for imparting a magnetic orientation in the circumferential direction so as to impart a magnetic anisotropy to the magnetic disk in the circumferential direction. The disk surface has a value of the contact ratio [BH 1.0 nm] falling within a range of 7% to 15% in a region having a height not smaller than 1.0 nm, based on the height at which a contact ratio in a bearing curve of a surface roughness is 50%.

A magnetic disk apparatus according to another aspect of the present invention comprises: the magnetic disk; a driving section which supports and rotates the magnetic disk; a magnetic head which reads and writes information from and in the magnetic disk, the magnetic head having a fly height not larger than 10.0 nm from the magnetic disk; and a head suspension assembly supporting the magnetic head.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a graph showing the relationship between the surface roughness of the magnetic disk and the pressure, i.e., the TD pressure and the TO pressure;

FIG. 8 is a graph showing the relationship between the surface roughness of the magnetic disk and the Δpressure;

FIG. 11 is a table showing the TD pressure, the TO pressure, the Δpressure, and the presence or absence of the reduction in the rotating speed in relation to the surface roughness in the inner circumferential portion, the intermediate circumferential section and the outer circumferential portion of the magnetic disk.

DETAILED DESCRIPTION OF THE INVENTION

A magnetic disk according to an embodiment of the present invention and a hard disk drive (HDD) equipped with the magnetic disk will now be described with reference to the accompanying drawings.

Figure 1:
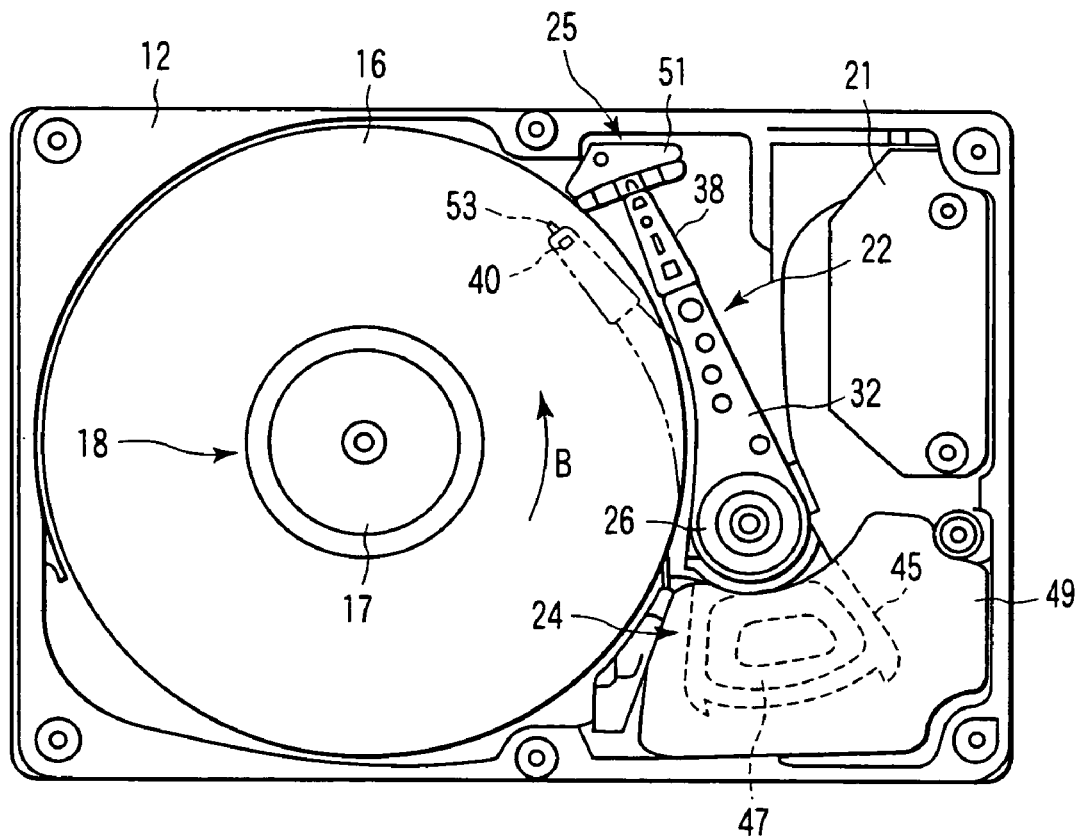
FIG. 1 is a plan view schematically showing the construction of an HDD according to an embodiment of the present invention.

As shown in FIG. 1, the HDD comprises a rectangular box-shaped case 12 opened at the upper end, and a top cover (not shown) screwed to the case 12 by a plurality of screws so as to close the upper opening of the case 12.

Housed in the case 12 are, for example, two magnetic disks 16 (one magnetic disk 16 alone being shown in FIG. 1) each used as a recording medium, a spindle motor 18 acting as a driving section for supporting and driving the magnetic disk, a plurality of magnetic heads for writing and reading information in and from the magnetic disk, a carriage assembly 22 supporting the magnetic heads so as to be movable relative to the magnetic disk 16, a voice coil motor (VCM) for rotating and positioning the carriage assembly 22, a ramp road mechanism 25 for holding the magnetic heads in a retreat position away from the magnetic disks when the magnetic heads are moved to the outermost circumference of the magnetic disks, and a substrate unit 21 including, for example, a read-write amplifier providing a processing circuit of a read-write signal.

A printed circuit substrate (not shown) for controlling the operations of the spindle motor 18, the VCM 24 and the magnetic head is screwed to the outer surface of the bottom wall of the case 12 with the substrate unit 21 interposed therebetween.

A magnetic recording layer is formed on each of the upper surface and the lower surface of each of the magnetic disks 16. The two magnetic disks 16 are engaged with the outer periphery of a hub (not shown) of the spindle motor 18 and fixed onto the hub by a clamp spring 17. As a result, the two magnetic disks 16 are coaxially stacked one upon the other with a prescribed clearance therebetween. These two magnetic disks 16 are integrally rotated at a prescribed rotating speed, e.g., 4200 rpm, in the direction denoted by an arrow B by driving the spindle motor 18.

The carriage assembly 22 includes a bearing unit 26 fixed to the bottom wall of the case 12 and a plurality of arms 32 extending from the bearing unit 26. These arms 32 are positioned a prescribed distance apart from each other and parallel to the surface of the magnetic disk 16 and extend in the same direction from the bearing unit 26. The carriage assembly 22 includes elongated plate-shaped suspensions 38 that can be elastically deformed. The suspensions 38 are formed of a leaf spring. The proximal end of each suspension 38 is fixed to the tip of the corresponding arm 32 by means of the spot welding or adhesion and the suspension 38 extends outward from the arm 32. Incidentally, it is possible for each suspension 38 to be formed integral with the corresponding arm 32. The arm 32 and the suspension 38 collectively form a head suspension, and the head suspension thus formed and the magnetic head collectively form a head suspension assembly.

Figure 2:
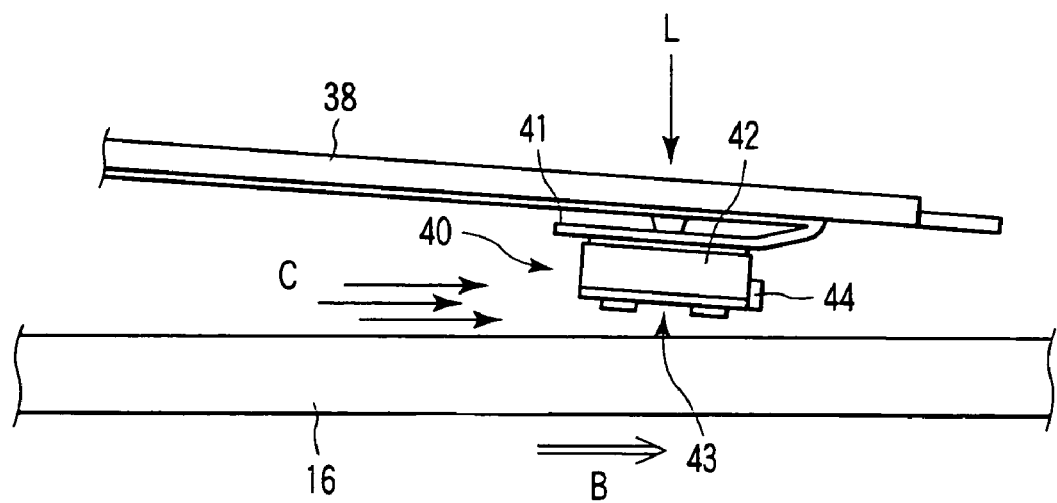
FIG. 2 is a side view showing in a magnified fashion the magnetic disk portion included in the HDD shown in FIG. 1.

As shown in FIG. 2, each magnetic head 40 includes a substantially rectangular slider 42 and a read-write head portion 44 formed on the edge surface of the slider 42. The magnetic head 40 of the particular construction is fixed to a gimbal spring 41 mounted to the tip portion of the suspension 38. A head load L directed toward the surface of the magnetic disk 16 is applied to each of the magnetic heads 40 by the elasticity of the suspensions 38. During operation of the HDD, the fly height of the magnetic head 40 relative to the magnetic disk 16 is set at 10.0 nm or less.

As shown in FIG. 1, the carriage assembly 22 includes a supporting frame 45 extending from the bearing unit 26 in a direction opposite to the extending direction of the arms 32. A voice coil 47 constituting a part of the VCM 24 is supported by the supporting frame 45. The supporting frame 45 is formed integral on the outer circumferential surface of the voice coil 47 by using a synthetic resin. The voice coil 47 is positioned between a pair of yokes 49 fixed to the case 12 and constitutes the VCM 24 together with these yokes 49 and a magnet (not shown) fixed to one of these yokes 49. The carriage assembly 22 is rotated about the bearing unit 26 when an electric current is supplied into the voice coil 47, with the result that the magnetic head 40 is moved to and positioned on a desired track on the magnetic disk 16.

The ramp road mechanism 25 includes a ramp 51 formed on the bottom wall of the case 12 and arranged on the outside of the magnetic disks 16 and a tub 53 extending from the tip end of each of the suspensions 38. When the carriage assembly 22 is rotated to the retreat position on the outside of the magnetic disks 16, each tub 53 is engaged with the ramp surface formed on the ramp 51 and, then, pulled upward by the inclination of the ramp surface so as to perform the unload operation of the magnetic head.

The magnetic disk 16 included in the HDD will now be described in detail.

According to the present embodiment, the contact ratio [BH 1.0 nm] is used as an index denoting the surface roughness of the magnetic disk. The contact ratio [BH 1.0 nm] denotes the value of the contact ratio at a height not smaller than 1.0 nm, with the height, at which the contact ratio in the bearing curve of the surface roughness measured by an atomic force microscope (AFM) is 50%, used as a standard.

The contact ratio [BH 1.0 nm] has a high relevancy to the fly height stability in a very low fly height region. It is possible to secure a fly height stability while maintaining the superiority in the electromagnetic conversion characteristics of the magnetic disk even in the case of a very low fly height that the fly height of the magnetic head is not larger than 10.0 nm by controlling the surface roughness of the magnetic disk such that the contact ratio [BH 1.0 nm] falls within a range of 7% to 15%.

A new index is used for defining the surface roughness of a magnetic disk, and the surface roughness is optimized on the basis of the new index. As a result, there can be provided a magnetic disk having a high reliability even in the case where the recording density is not lower than 70 GB/inch$^2$ and the fly height of the magnetic head is not larger than 10.0 nm and also provided a magnetic disk apparatus equipped with the particular magnetic disk.

Figure 3:
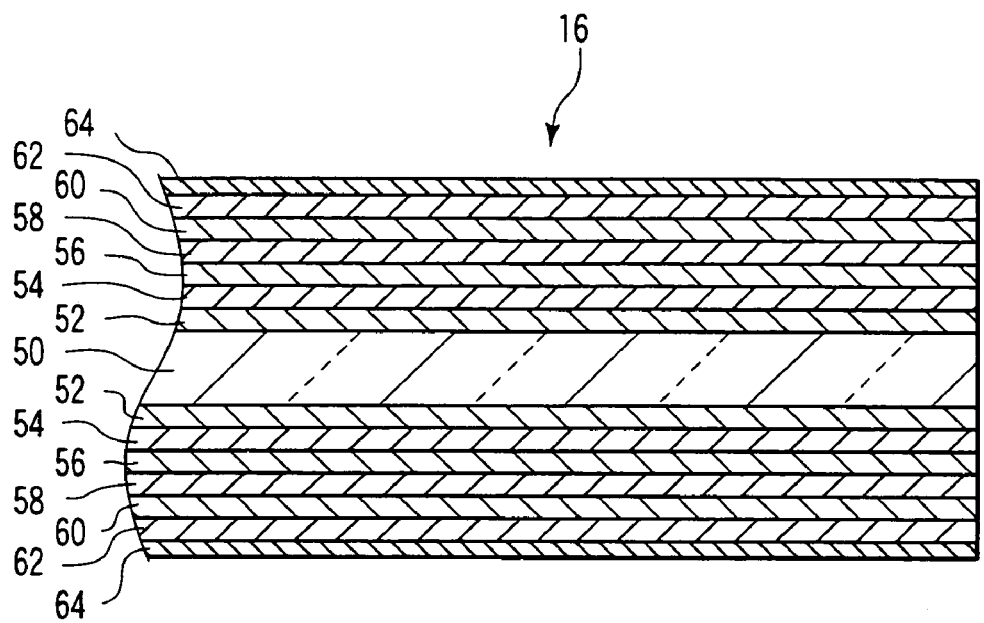
FIG. 3 is a cross sectional view schematically showing the construction of the magnetic disk according to one embodiment of the present invention.

As shown in FIG. 3, the magnetic disk 16 includes as a substrate 50 a crystallized glass substrate having a thickness of 0.5 mm and a diameter of 1.8 inches. A polishing treatment is applied to the surface of the substrate 50 by using an abrasive slurry containing cerium oxide. A texture processing, which uses "1800CP" manufactured by EDC in U.S. as the processing apparatus, is applied to the surface of the substrate 50 in the circumferential direction by using a diamond slurry. As a result, the magnetic disk 16 constitutes a so-called "texture medium".

A multi-layered film is formed on each surface of the substrate 50 by a sputtering process. Specifically, a first underlying film 52 made of CrTi and a second underlying layer made of a Cr series alloy and having a thickness of 10.0 nm are formed successively on each surface of the substrate 50. A laminate structure consisting of a stabilizing film 56 made of a CoCrPtB alloy and having a thickness of 2 nm, an intermediate film 58 made of Ru and having a thickness of 1 nm, a magnetic recording film 60 made of a CoCrPtB alloy and having a thickness of 5.0 nm, and a protective film 62 made of carbon and having a thickness of 3.0 nm are formed on the second underlying film 54. The protective film 62 is coated with a lubricant containing, for example, perfluoro polyether as the main component so as to form a lubricating film 64 in a thickness of 1.7 nm on the protective film 62.

Figure 4:
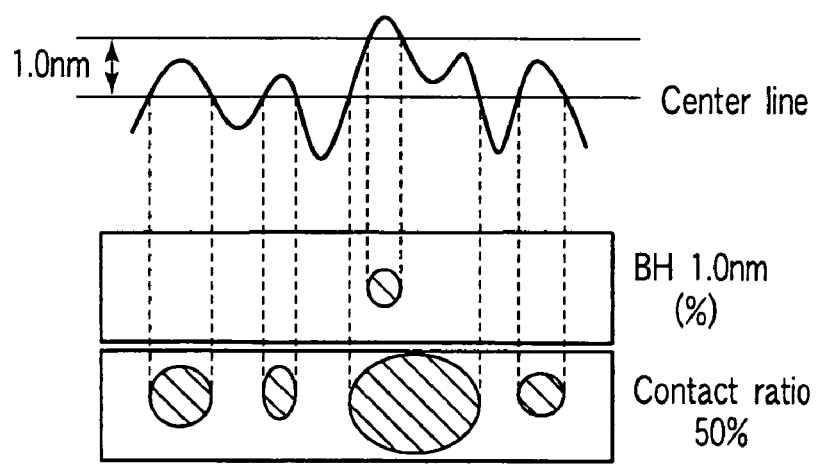
FIG. 4 is a drawing for explaining the index denoting the surface roughness of the magnetic disk.

The surface roughness of the magnetic disk 16 of the construction described above is determined to fall within a prescribed range that is defined by using a new index. To be more specific, the roughness of each surface of the magnetic disk 16 is determined such that the value of the contact ratio [BH 1.0 mm] in the region having a height not smaller than 1.0 nm falls within a range of between 7% and 15% based on the height at which the contact ratio is 50% in the bearing curve of the surface roughness measured by the atomic force microscope (AFM). As shown in FIG. 4, each surface of the magnetic disk 16 is formed such that, in a cross section parallel to the surface of the magnetic disk 16, the height position of the cross section at which the cross sectional area of the asperity and valley on the disk surface occupies 50% of the entire cross section of the magnetic disk is used as a center line, and the area of the cross section in the position where the height from the center line is not smaller than 1.0 nm falls within a range of between 7% and 15% of the area of the measured range (10 μm×10 μm).

The height of asperity on the surface of the magnetic disk is low, i.e., about 3.0 nm, and the asperity is pushed into the magnetic disk by several nanometers when the magnetic disk is brought into contact with the magnetic head. Such being the situation, the index noted above has been created on the basis that the adhesion properties between the slider of the magnetic head and the magnetic disk are determined mainly by the contact area between the slider and the surface of the magnetic disk when the asperity is pushed into the magnetic disk by about 1.0 nm.

The shape on the surface of the magnetic disk 16 can be obtained by applying a texture processing (for forming a groove in a circumferential direction) to the surface of the substrate 50 in addition to, for example, a mechanical processing or a chemical surface processing so as to impart a magnetic anisotropy to the magnetic disk 16. The substrate 50 can be formed of, for example, aluminosilicate, an amorphous glass such as soda lime, a crystallized glass such as lithium silicate, or an aluminum alloy, though the material of the substrate 50 is not particularly limited as far as it is possible to form the particular surface shape noted above. It should be noted, however, that, since the crystallized glass has a relatively large curvature radius at the tip of the asperity, the asperity tends to remain unremoved after the texture processing and, thus, the roughness can be controlled easily. Such being the situation, it is desirable for the substrate 50 to be formed of a crystallized glass. In the case of using a crystallized glass, the roughness on the surface of the substrate is changed depending on the crystallizing temperature, the polishing conditions such as the kind of the slurry used, the kind of the polishing cloth, the processing pressure and the processing time, and the texture conditions such as the kind of the slurry used, the kind of the processing tape used, the processing load and the processing time. After formation of the film on the surface of the substrate 50, the surface roughness of the magnetic disk is changed depending on the material and the thickness of the underlying layer, and the tape varnish conditions.

The present inventors have conducted a comparative test by manufacturing various samples of magnetic disks differing from each other in the surface roughness ([BH 1.0 nm] being about 4% to 20%). These samples were rendered different from each other in the surface roughness by changing the polishing conditions of the crystallized substrate and the process conditions of the texture such as the kind of the slurry used, the processing load, and the processing time. In conducting the comparative test, an atomic force microscope was used for measuring the shape of the surface of the magnetic disk, the measuring range was set at 10 μm×10 μm, and the number of scanning lines was set at 256. Before performing the arithmetic calculation of the bearing curve, the measured data were subjected to a filter processing plain fit (order=1, X, Y directions) and to a flatten (order=0).

Figure 5:
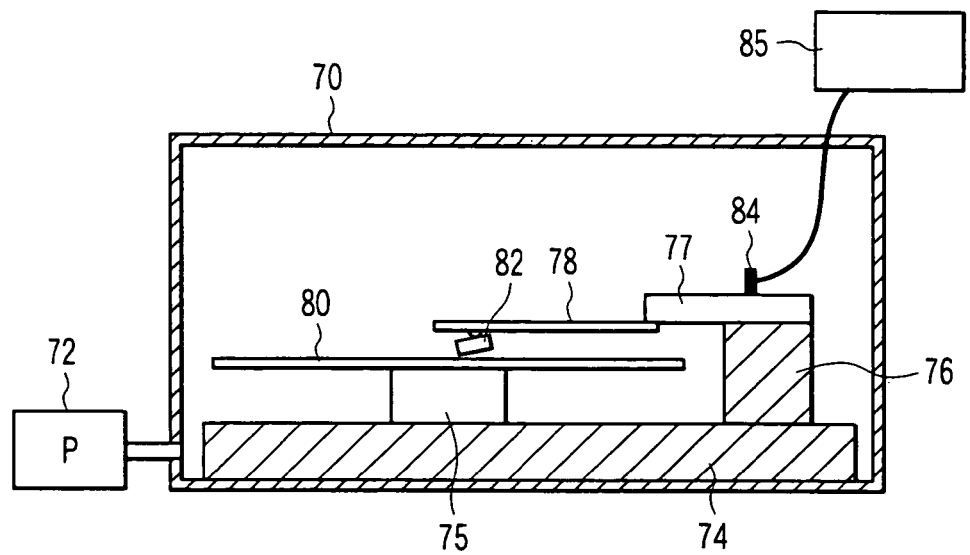
FIG. 5 is a cross sectional view schematically showing the construction of a TD-TO test apparatus for the magnetic disk.

In order to evaluate the adhesion properties of the magnetic disk, a TD-TO test was applied to each sample. As shown in FIG. 5, the test apparatus used for the TD-TO test comprises a chamber 70. An exhaust pump 72 is connected to the chamber 70 so as to make it possible to lower the pressure within the chamber 70 to about 0.3 atm. A stage 74 is arranged within the chamber 70, and a spindle motor 75 and a supporting post 76 are arranged on the stage 74. A magnetic disk 80 used as a sample is supported by the spindle motor 75 so as to be rotated at the rotating speed of, for example, 4200 rpm. An arm 77 and a suspension 78 are mounted to the supporting post 76, and a magnetic head 82 to be tested is supported at the tip of the suspension 78. An acoustic emission (AE) sensor 84 for detecting the degree of contact between the magnetic head 82 and the magnetic disk 80 is mounted to the arm 77, and the AE sensor 84 is connected to an oscilloscope 85.

Figure 6:
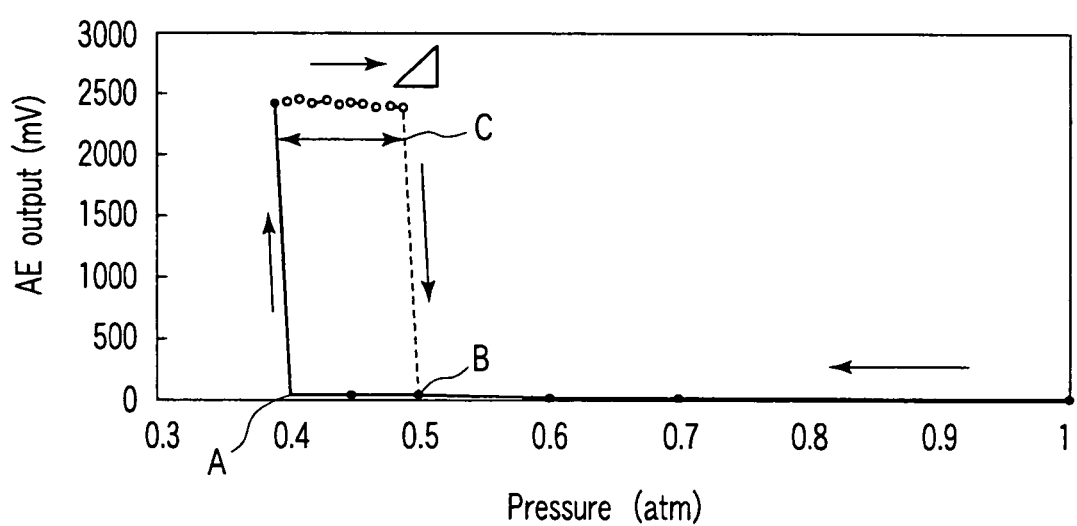
FIG. 6 is a graph showing the relationship between the pressure and the AE output in the TD-TO test.

In conducting the TD-TO test, the magnetic disk 80 is mounted to the spindle motor 75 so as to be rotated at the rotating speed of 4200 rpm. Under this state, the pressure within the chamber 70 is gradually lowered so as to decrease the fly height of the magnetic head 82 relative to the surface of the magnetic disk 80. While the fly height of the magnetic head 82 is being decreased, the output of the AE sensor 84 is monitored by the oscilloscope 85. As shown in FIG. 6, the output of the AE sensor 84 is rapidly increased at the time when the pressure within the chamber 70 is lowered to reach a certain level. This indicates that the magnetic head has been brought into contact with the surface of the magnetic disk. The pressure at this stage constitutes a touch down (TD) pressure A.

If the pressure within the chamber 70 is increased by contraries in the next stage, the AE output is maintained at a large value until the pressure is increased to reach a certain level and, then, is abruptly lowered to a noise level. This indicates that the magnetic head has been caused to fly again from the surface of the magnetic disk. The pressure at this stage constitutes a take-off (TO) pressure B. Also, the difference between the TO pressure B and the TD pressure A, i.e., B−A, constitutes Δ pressure C. The test for measuring the TD pressure A, the TO pressure B and the Δ pressure C is called a TO-TD test.

The TO-TD test was conducted on the plural samples. It has been clarified that the Δ pressure C suggests the adhesion properties of the magnetic disk, and that, in the magnetic disk in which the TO pressure exceeds 0.7 atm, the problem of adsorption is tends to be generated at the pressure of 0.7 atm that is specified in the actual magnetic disk apparatus.

Under the circumstances, in order to optimize the surface roughness of the magnetic disk, a TD-TO test similar to that described above has been conducted by using the various sample disks described above and a magnetic head having the fly height that is not larger than 10.0 nm. FIG. 7 is a graph showing the relationship between the pressures, i.e., the TD pressure and the TO pressure, and [BH 1.0 nm]. Also, FIG. 8 is a graph showing the relationship between [BH 1.0 nm] and the Δpressure C.

As apparent from FIG. 7, in order to allow the TO pressure to be not higher than 0.7 atm including the non-uniformity of the data, it is necessary for [BH 1.0 nm] to be not smaller than 7%. If [BH 1.0 nm] is smaller than 7%, the TD pressure is not lowered even if the surface roughness of the magnetic disk is lowered. As apparent from FIG. 8, the Δpressure C is rapidly increased. In other words, the adhesion properties are increased. As a result, generated is the phenomenon that the magnetic head does not fly from the surface of the magnetic disk even at the pressure of 0.7 atm. In this fashion, if [BH 1.0 nm] is smaller than 7%, the surface of the magnetic disk is rendered excessively flat so as to increase adhesion properties, resulting in a rapid increase in the friction force that is generated when the magnetic head is brought into contact with the magnetic disk. As a result, the magnetic head is vibrated so as to render the recording-reproduction unstable. Alternatively, the magnetic head and the magnetic disk are broken in some cases.

As described above, it is possible to ensure the fly height stability of the magnetic head under an environment of a reduced pressure of 0.7 atm even under a very small fly height, i.e., 10.0 nm of the fly height of the magnetic head, by setting [BH 1.0 nm] at a value not smaller than 7% as the surface roughness of the magnetic disk.

Then, in order to look into the situation in respect of the pick-up phenomenon of the lubricant performed by the magnetic head, which is worried about in the case where the surface roughness of the magnetic disk is large, a load-unload test was conducted as follows. As in the TD-TO test described above, prepared were a plurality of magnetic disk samples each sized at 2.5 inches and differing from each other in the value of [BH 1.0 nm]. Each magnetic disk was incorporated in a magnetic disk apparatus that was rotated at a rotating speed of 10,000 rpm, and the operation to load and unload the magnetic head onto and out of the magnetic disk surface was repeatedly carried out. The test was conducted under the temperature of 70° C. and the relative humidity of 80%, and the load-unload cycle was performed 500,000 times. Then, the magnetic disk apparatus was dismantled so as to look into the attachment of the lubricant to the magnetic head.

Figures 9, 10:
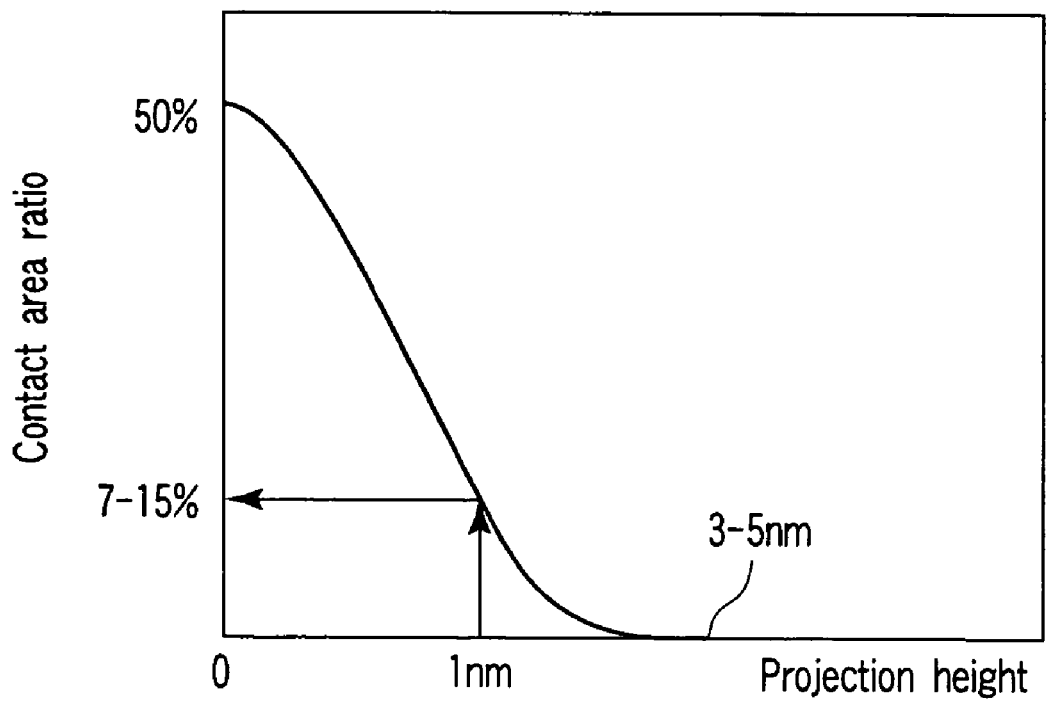
FIG. 9 is a table showing the presence or absence of the lubricant pick-up phenomenon in relation to the surface roughness of the magnetic disk.
FIG. 10 is a graph showing the relationship between the height of the asperity on the surface of the magnetic disk and the contact area ratio.

FIG. 9 is a table showing the result of the load-unload test. As apparent from FIG. 9, the pick-up phenomenon of the lubricant was observed in the case where [BH 1.0 nm] was larger than 15%. It is considered reasonable to understand that the lubricant pick-up phenomenon tends to be generated with increase in the contact frequency between the magnetic head and the magnetic disk. Generation of the lubricant pick-up phenomenon also indicates that the thermal asperity and the breakdown of the magnetic head caused by the electrostatic breakdown tend to be generated easily. If the value of [BH 1.0 nm] is larger than 15%, the surface of the magnetic disk is rendered rough, with the result that it is difficult to shorten the spacing between the magnetic head and the magnetic disk. It follows that it is difficult to achieve a high recording density exceeding 70 GB/inch$^2$, and it is impossible to ensure the reliability of the magnetic disk and the magnetic disk apparatus.

Under the circumstances, in the case where the surface roughness of the magnetic disk is controlled to permit the value of [BH 1.0 nm] to fall within a range of between 7% and 15% as shown in FIG. 10, it is possible to secure the high recording density not lower than 70 GB/inch$^2$ and the fly height stability of the magnetic head while maintaining the superiority in the electromagnetic conversion characteristics of the magnetic disk even in the case of a very low fly height that the fly height of the magnetic head is not larger than 10.0 nm.

The value of the difference Rp between the center line of the height of the asperity on the disk surface and the maximum height of the asperity, i.e., the maximum height of the asperity that can be obtained from the curve denoting the surface roughness of the magnetic disk, was measured in respect of the magnetic disk having the value of [BH 1.0 nm] falling within a range of between 7% and 15%. The value of the difference Rp was found to fall within a range of 2.0 nm to 3.9 nm. The correlation between the adhesion properties of the magnetic disk and the value of Rp is low. Therefore, the lower limit of the surface roughness of the magnetic disk is not referred to. However, in order to secure the reliability of the magnetic disk, it is desirable for the value of Rp to be not larger than 4.0 nm in respect of the upper limit in the surface roughness of the magnetic disk. If the value of Rp is larger than 4.0 nm, the magnetic spacing is enlarged, and the problems such as the thermal asperity and the lubricant pick-up phenomenon tend to be generated easily.

Suppose the data recording region of a magnetic disk is equally divided in the radial direction into three sections so as to form an inner circumferential section, an intermediate circumferential section and an outer circumferential section. The intermediate circumferential section has a radius of about 22 mm in the case of a 2.5 inch disk and about 16 mm in the case of a 1.8 inch disk. The inner circumferential region has a radius of about 15 mm or less in the case of a 2.5 inch disk and about 11 mm or less in the case of a 1.8 inch disk. The outer circumferential region has a radius of 29 mm or more in the case of a 2.5 inch disk and 21 mm or more in the case of a 1.8 inch disk. When it comes to a magnetic disk having relatively high adhesion properties such that the value of [BH 1.0 nm] is not larger than 10.0% on the disk surface in the intermediate circumferential section, it is desirable for the value of [BH 1.0 nm] on the disk surface in the inner circumferential section and the outer circumferential section to be equal to or larger than that in the intermediate circumferential section.

In the inner circumferential section of the magnetic disk, the magnetic disk tends to be deformed under the influence of the clamp so as to increase the contact frequency between the magnetic head and the magnetic disk and, thus, the measure against the adsorption is rendered severer. Since the adhesion properties are high so as to generate a big friction force, generated is the phenomenon that the rotating speed is lowered in the outer circumferential section, which has a large torque, of the magnetic disk. If the rotating speed of the magnetic disk is lowered, the fly height of the magnetic head is lowered so as to further impair the fly height stability.

The TD-TO test described previously was conducted by preparing a plurality of 1.8 inch magnetic disks differing from each other in the shape of the surface. Specifically, prepared were magnetic disks having the value of [BH 1.0 nm], which was not larger than 10.0% on the disk surface. One of the magnetic disks included the inner circumferential section and the outer circumferential section differing from each other in the surface roughness, and another magnetic disk included the inner circumferential section and the outer circumferential section that were substantially equal to each other in the surface roughness. FIG. 11 is a table showing the experimental data.

Where the surface roughness in the inner circumferential section is relatively large compared with that in the intermediate circumferential section as in the magnetic disk according to this embodiment of the present invention, the TO pressure in each of the inner circumferential section and the outer circumferential section is held substantially equal to that in the intermediate circumferential section even if the TD pressure is increased under the influence caused by, for example, deformation of the magnetic disk. However, where the surface roughness in the inner circumferential section is relatively small as in the magnetic disk for Comparative Example 1, the TO pressure in the inner circumferential section is rendered higher than the TO pressure in the intermediate circumferential section. As a result, the margin in the fly height stability of the magnetic head is decreased.

If the surface roughness in the outer circumferential section of the magnetic disk is relatively small as in the magnetic disk for Comparative Example 2, the rotating speed of the magnetic disk is lowered so as to rapidly increase the TO pressure. The rotating speed is not lowered in the magnetic disk in which the value of [BH 1.0 nm] is not smaller than 7%. However, as apparent from Comparative Example 1, the TO pressure in the outer circumferential section of the magnetic disk is higher than that in the intermediate circumferential section and the inner circumferential section of the magnetic disk. Such being the situation, it is desirable for the surface roughness in the outer circumferential section of the magnetic disk to be large.

As described above, it is possible to secure a satisfactory fly height stability of the magnetic head over the entire region of the magnetic disk by making the surface roughness in the inner circumferential section of the magnetic disk larger than or at least equal to that in the intermediate circumferential section of the magnetic disk, or by making the surface roughness of the outer circumferential section of the magnetic disk larger than or at least equal to that in the intermediate circumferential section of the magnetic disk.

The magnetic disk of the construction described above was incorporated in the magnetic disk apparatus shown in FIG. 1 so as to apply a random seek test to the entire region of the magnetic disk under an environment of a reduced pressure of 0.7 atm. Measured was the change in the performance (i.e., the time required for the read/write on the entire region of the magnetic disk) of the magnetic disk apparatus 24 hours later. The fly height of the magnetic head 40 was not larger than 10.0 nm. As a result, deterioration in the performance was not recognized so as to make it possible to obtain a magnetic disk apparatus having a high recording density, which was not lower than 70 GB/inch$^2$, and a high reliability.

The present invention is not limited to the embodiment described above. It is possible to modify the constituting factors of the present invention within the technical scope of the present invention in actually working the invention. Also, various inventions can be achieved by an appropriate combination of the plural constituting factors disclosed in the embodiment described above. For example, it is possible to delete some constituents from the entire constituents disclosed in the embodiment described above. Further, it is possible to combine appropriately the constituting factors included in different embodiments of the present invention.

For example, in the magnetic disk of the present invention, the materials, the thickness, etc. of the underlying films, the intermediate film, the lubricating film, etc. are not limited to those given in the embodiment described above. It is possible in the present invention to select appropriately the materials etc. noted above as required. Also, two magnetic disks are used in the magnetic disk apparatus according to the embodiment of the present invention described above. However, it is possible to increase or decrease the number of magnetic disks used in the magnetic disk apparatus appropriately, as required.

What is claimed is:

1. A magnetic disk comprising a substrate, a laminate structure formed on the substrate, the laminate structure including an underlying film, a magnetic recording film, a protective film and a lubricating film, and a disk surface applied with a texture processing for imparting a magnetic orientation in the circumferential direction so as to impart a magnetic anisotropy to the magnetic disk in the circumferential direction, the disk surface having a value of the contact ratio [BH 1.0 nm] falling within a range of 7% to 15% in a region having a height not smaller than 1.0 nm, based on the height at which a contact ratio in a bearing curve of a surface roughness is 50%.

2. The magnetic disk according to claim 1, wherein the disk surface has 4 nm or less of a maximum asperity height, which is obtained form a curve of the surface roughness.

3. The magnetic disk according to claim 1, wherein the value of the contact ratio [BH 1.0 nm] at an inner circumferential section on the disk surface is not smaller than the value of the contact ratio [BH 1.0 nm] in an intermediate circumferential section on the disk surface.

4. The magnetic disk according to claim 1, wherein the value of the contact ratio [BH 1.0 nm] in an outer circumferential section on the disk surface is not smaller than the value of the contact ratio [BH 1.0 nm] in an intermediate circumferential section on the disk surface.

5. The magnetic disk according to claim 2, wherein the value of the contact ratio [BH 1.0 nm] at an inner circumferential section on the disk surface is not smaller than the value of the contact ratio [BH 1.0 nm] in an intermediate circumferential section on the disk surface.

6. The magnetic disk according to claim 2, wherein the value of the contact ratio [BH 1.0 nm] in an outer circumferential section on the disk surface is not smaller than the value of the contact ratio [BH 1.0 nm] in an intermediate circumferential section on the disk surface.

7. A magnetic disk apparatus comprising:
the magnetic disk according to claim 1;
a driving section which supports and rotates the magnetic disk;
a magnetic head which reads and writes information from and in the magnetic disk, the magnetic head having a fly height not larger than 10.0 nm from the magnetic disk; and
a head suspension assembly supporting the magnetic head.

8. A magnetic disk apparatus comprising:
the magnetic disk according to claim 2;
a driving section which supports and rotates the magnetic disk;
a magnetic head which reads and writes information from and in the magnetic disk, the magnetic head having a fly height not larger than 10.0 nm from the magnetic disk; and
a head suspension assembly supporting the magnetic head.

* * * * *